United States Patent
Yeh et al.

(10) Patent No.: US 10,098,134 B2
(45) Date of Patent: Oct. 9, 2018

(54) METHOD AND APPARATUS FOR CONTROLLING PRIORITY IN DEVICE TO DEVICE COMMUNICATION

(71) Applicant: ELECTRONICS AND TELECOMMUNICATIONS RESEARCH INSTITUTE, Daejeon (KR)

(72) Inventors: Choongil Yeh, Daejeon (KR); Young Jo Ko, Daejeon (KR); Kyoung Seok Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 140 days.

(21) Appl. No.: 15/154,484

(22) Filed: May 13, 2016

(65) Prior Publication Data

US 2016/0338079 A1 Nov. 17, 2016

(30) Foreign Application Priority Data

| May 15, 2015 | (KR) | 10-2015-0068110 |
| Sep. 22, 2015 | (KR) | 10-2015-0134046 |
| May 12, 2016 | (KR) | 10-2016-0058320 |

(51) Int. Cl.
H04W 72/10 (2009.01)

(52) U.S. Cl.
CPC ................... H04W 72/10 (2013.01)

(58) Field of Classification Search
CPC ............. H04W 72/10; H04W 72/0406; H04W 72/0493; H04W 72/121; H04W 72/1247
See application file for complete search history.

(56) References Cited

U.S. PATENT DOCUMENTS

| 2013/0288645 | A1* | 10/2013 | Zheng | H04W 72/0446 455/411 |
| 2014/0321377 | A1 | 10/2014 | Ryu et al. | |
| 2015/0009917 | A1 | 1/2015 | Cho et al. | |
| 2015/0230258 | A1 | 8/2015 | Kwon et al. | |
| 2015/0326492 | A1* | 11/2015 | Jeong | H04W 74/0866 370/329 |
| 2015/0382324 | A1* | 12/2015 | Sheng | H04W 72/02 370/329 |
| 2016/0302215 | A1* | 10/2016 | Sorrentino | H04W 76/023 |
| 2016/0374105 | A1* | 12/2016 | Kalhan | H04W 72/1278 |
| 2017/0006634 | A1* | 1/2017 | Luo | H04W 74/085 |

FOREIGN PATENT DOCUMENTS

KR 10-2014-0129503 A 11/2014

OTHER PUBLICATIONS

"Resource pool handling for priority support", R2-152422, 3GPP TSG RAN WG2 #90, May 25-29, 2015.

* cited by examiner

Primary Examiner — Rina C Pancholi
(74) Attorney, Agent, or Firm — Rabin & Berdo, P.C.

(57) ABSTRACT

The present invention relates to a method and an apparatus for controlling priority in device-to-device communications. A plurality of transmission resources are classified into resource index sets depending on indexes, and a priority given to a communication object to which a device communication is applied is determined. One resource index set is allocated to a device of the communication object depending on the priority of the communication object.

7 Claims, 4 Drawing Sheets

Transmit long packet by using a plurality of continuous periods

Transmit short packet by using one period

METHOD AND APPARATUS FOR CONTROLLING PRIORITY IN DEVICE TO DEVICE COMMUNICATION

CROSS-REFERENCE TO RELATED APPLICATION

This application claims priority to and the benefit of Korean Patent Application Nos. 10-2015-0068110, 10-2015-0134046, and 10-2016-0058320, filed in the Korean Intellectual Property Office on May 15, 2015, Sep. 22, 2015 and May 12, 2016, respectively, the entire contents of which are incorporated herein by reference.

BACKGROUND OF THE INVENTION (a) Field of the Invention

The present invention relates to a method and an apparatus for controlling priority in device-to-device communications.

(b) Description of the Related Art

With recent development of wireless communication systems, device-to-device (D2D) communications have become an issue. Particularly, as LTE-Advanced technology is commercially available, many D2D communications methods based on the LTE-Advanced technology have been researched.

According to the D2D communications, terminals form and maintain D2D communication networks by using radio resources that are dispersedly limited, in order to perform operations such as synchronization, peer discovery, paging, and data traffic communications.

In the synchronization operation, basic time and frequency synchronizations are performed between terminals through, e.g., a global positioning system (GPS). The peer discovery operation identifies neighboring terminals that are geographically adjacent thereto by using terminal information broadcasted from each terminal, and the paging operation forms a D2D link for a single direction transmission between terminals which want to perform communication. The data traffic communication operation performs link scheduling and corresponding data transmission based on links formed through these operations.

Various applications or user groups may use such D2D communications, and may have different priorities. A related technique for performing communications between devices having different priorities is disclosed in Korean Patent Publication No. 2014-0129503 "SCHEME FOR D2D COMMUNICATION USING PRIORITY."

SUMMARY OF THE INVENTION

The present invention has been made in an effort to provide a method and an apparatus for efficiently controlling priorities of communication objects in various applications and user groups that use device-to-device (D2D) communications.

An exemplary embodiment of the present invention provides a priority control method in device-to-device communications, including: classifying a plurality of transmission resources into resource index sets depending on indexes; determining a priority given to a communication object to which a device communication is applied; and allocating one resource index set to a device of the communication object depending on the priority of the communication object.

Each of the resource index sets may include different numbers of resource indexes, and as the priority of a communication object is increased, a resource index set having more resource indexes may be allocated to a corresponding device in the allocating of the resource index to the device of the communication object.

As the priority of a communication object is increased, larger power may be allocated to a corresponding device in the allocating of the resource index to the device of the communication object.

An exclusive data resource may be allocated to a resource index set that is allocated to a communication object having a high priority in the allocating of the resource index to the device of the communication object, and the data resource may include a resource for a physical sidelink shared channel (PSSCH).

A data resource may be preferentially allocated to a communication object having a highest priority compared with a communication object having another priority in the allocating of the resource index to the device of the communication object.

The method may further include additionally transmitting a resource reservation indication bit while transmitting a control signal by using a resource corresponding to a resource index set by using a resource allocated to a device.

When a control signal is transmitted for an $n^{th}$ predetermined period, a resource reservation indication bit is set as a predetermined value, to instruct to reserve and use a same resource as a resource used when the control signal is transmitted, for an $(n+1)^{th}$ predetermined period, in the additionally transmitting.

In the additionally transmitting, when a resource reservation indication bit is set as predetermined value while transmitting a control signal for a last predetermined period of predetermined periods that are continuously repeated in one frame, it may be instructed to reserve and use a same resource as a resource used when the control signal is transmitted for a first period included in a next frame.

An authority to use the resource reservation indication bit may be given to a communication object having a priority that is equal to or higher than a predetermined level, in the additionally transmitting of the resource reservation indication bit.

A device of the communication object that receives the authority to use the resource reservation indication bit may be permitted to set the resource reservation indication bit to have a first value to indicate resource reservation or a second value to indicate no resource reservation to be used, and a device of a communication object that receives no authority is permitted to set the resource reservation indication bit as the second value.

The method may further include transmitting a reference signal indicating whether to use a channel by using a resource corresponding to a resource index set allocated a device.

The reference signal may be defined as a first reference signal for instructing continuous use of a channel and a second reference signal for instructing to end the use of the channel. The transmitting of the reference signal may include: transmitting the first reference signal when a device that transmits a packet for a current period continuously transmits the packet for a next period; and transmitting the first reference signal when a device that transmits a packet for a current period does not use the channel for a next period.

The method may further include: receiving the first reference signal or the second reference signal by another device; stopping packet transmission for a next period by said another device when a magnitude of the first reference signal is equal to or greater than a predetermined level; and attempting packet transmission by said another device when a magnitude of the second reference signal is equal to or greater than a predetermined level.

A plurality of reference signals may be defined, and each of the reference signals may correspond to a priority. When a magnitude of a reference signal corresponds to a predetermined priority, a device having a priority that corresponds to or is higher than said predetermined priority may be permitted to attempt packet transmission.

The transmission resources may constitute one resource pool, each of the resource index sets may include a resource index that is given to at least one transmission resource, and the transmission resource may be for transmitting a control channel and/or a data channel. The communication object may include at least one of an application, a user group, and a user, and the control channel may be a physical sidelink control channel (PSCCH), while the data channel may be a physical sidelink shared channel (PSSCH).

Another exemplary embodiment of the present invention provides a priority control apparatus in device-to-device communications, including: an RF converter configured to transmit/receive a signal through an antenna; and a processor connected with the RF converter to perform priority control, wherein the processor classifies a plurality of transmission resources into resource index sets depending on indexes, determines a priority given to a communication object to which device communication is applied, and is configured to allocate one resource index set to a device of the communication object depending on a priority of the communication object.

In this priority control apparatus, each of the resource index sets may include different numbers of resource indexes, and as the priority of a communication object is increased, a resource index set having more resource indexes may be allocated to a corresponding device or larger power is allocated to a corresponding device.

The processor may be configured to additionally transmit a resource reservation indication bit while transmitting a control signal by using a resource corresponding to a resource index set by using a resource allocated to a device, and, when a control signal is transmitted for an $n^{th}$ predetermined period, a resource reservation indication bit may be set as a predetermined value, to instruct to reserve and use a same resource as a resource used when the control signal is transmitted, for an $(n+1)^{th}$ predetermined period, or when a resource reservation indication bit is set as a predetermined value while transmitting a control signal for a last predetermined period of predetermined periods that are continuously repeated in one frame, it may be instructed to reserve and use a same resource as a resource used when the control signal is transmitted for a first period included in a next frame.

The processor may be configured to give an authority to use the resource reservation indication bit to a communication object having a priority that is equal to or higher than a predetermined level. A device of the communication object that receives the authority to use the resource reservation indication bit may be permitted to set the resource reservation indication bit to have a first value to indicate resource reservation or a second value to indicate no resource reservation to be used, and a device of a communication object that receives no authority is permitted to set the resource reservation indication bit as the second value.

In this priority control apparatus, a plurality of reference signals may be defined, and each of the reference signals may correspond to a priority, and, when a magnitude of a reference signal corresponding to a predetermined priority, a device having a priority that corresponds to or is higher than said predetermined priority may be permitted to attempt packet transmission.

DETAILED DESCRIPTION OF THE EMBODIMENTS

Figure 1:
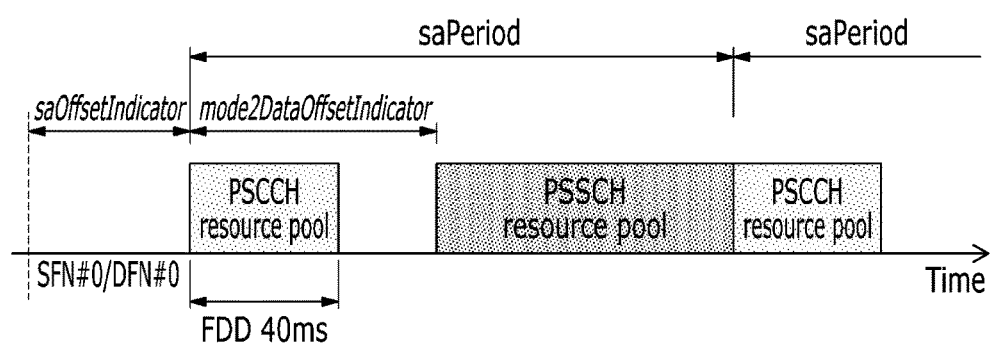
FIG. 1 illustrates a time-frequency resource for D2D communications according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Throughout the specification, a terminal may designate a mobile terminal (MT), a mobile station (MS), an advanced mobile station (AMS), a high reliability mobile station (HR-MS), a subscriber station (SS), a portable subscriber station (PSS), an access terminal (AT), or user equipment (UE), and it may include entire or partial functions of the MT, MS, AMS, HR-MS, SS, PSS, AT, and UE.

Further, a base station (BS) may designate an advanced base station (ABS), a high reliability base station (HR-BS), a nodeB (node B), an evolved node B (eNodeB), an access point (AP), a radio access station (RAS), a base transceiver station (BTS), a mobile multihop relay (MMR)-BS, a relay station (RS) for functioning as the base station, a relay node (RN) for functioning as the base station, an advanced relay station (ARS) for functioning as the base station, a high reliability relay station (HR-RS) for functioning as the base station, or a small base station (such as a femto BS, a home node B (HNB), a home eNodeB (HeNB), a pico BS, a metro BS, or a micro BS), and it may include entire or partial functions of the ABS, nodeB, eNodeB, AP, RAS, BTS, MMR-BS, RS, RN, ARS, HR-RS, and small base station.

In exemplary embodiments of the present invention, a long term evolution (LTE) technique of a $3^{rd}$ generation partnership project (3GPP) will be described as an example. However, a mobile communication system according to the present invention is not limited thereto.

According to the exemplary embodiments of the present invention, in device-to-device (D2D) communications, examples of a communication object to which a priority may include various applications, user groups, and users, but are not limited thereto.

Hereinafter, a priority control method and a priority control apparatus in the D2D communications according to the exemplary embodiments of the present invention will be described with reference to the accompanying drawings.

In LTE-based D2D communications, a transmitting terminal transmits data through two steps.

Step 1: allocating physical sidelink shared channel (PSSCH) resource through physical sidelink control channel (PSCCH) and performing scheduling for determining modulation and coding scheme (MSC) applied to PSSCH Step 2: Transmitting data through PSSCH according to scheduling of Step 1

Time-frequency resources for the D2D communication are shown as in FIG. 1.

FIG. 1 illustrates a time-frequency resource for D2D communications according to an exemplary embodiment of the present invention.

As shown in FIG. 1, the time-frequency resource for the D2D communications is divided into two regions, i.e., PSCCH resource pools and PSSCH resource pools. An expression that a channel such as a PSCCH or a PSSCH may be transmitted or received may replace another expression that a signal is transmitted or received through a channel such as a PSCCH or a PSSCH. In the exemplary embodiments of the present invention, a control channel includes a PSCCH and a data channel includes a PSSCH, but the present invention is not limited thereto.

In the PSCCH resource pool, the PSCCH can be transmitted by using a physical resource block (PRB) and a sub-frame, allocated for D2D transmission. A plurality of PSCCHs are multiplexed and transmitted by using the PSCCH resource pool, and each PSCCH is transmitted by using a same transmission format as a same-magnitude resource.

In the PSSCH resource pool, the PSSCH can be transmitted by using a PRB and a sub-frame, allocated for D2D transmission. A plurality of PSSCHs are multiplexed and transmitted by using the PSSCH resource pool. In this case, a magnitude and a transmission format of resources for PSSCH transmission may be changed by using the PSCCH every predetermined period saPeriod.

As shown in FIG. 1, the period saPeriod starts after a predetermined offset saOffsetIndicator passes from a time point at which a system frame number (SFN) starts, and is repeated until a next SFN starts (e.g., a period of SFN is 10,240 sub-frames in the LTE system).

Next, a priority control method in the D2D communications according to an exemplary embodiment of the present invention will be described.

In the D2D communications according to the exemplary embodiment of the present invention, methods of giving priorities to applications, user groups, or users will be described.

Method 1: A plurality of resource pools are set for channels (PSCCH and PSSCH), and a specific application/user group/user corresponds to a specific resource pool. In this case, as a target object has a higher priority, a larger resource pool is allocated to the target object.

For example, when four groups have different priorities, four resource pools for PSCCHs and PSSCHs are set. A user group #1, a resource pool #2, a user group #3, and a user group #4 respectively correspond to a resource pool #1, a user group #2, a resource pool #3, and a resource pool #4 such that the user group #k can use the resource pool #k to perform the D2D communications. In this case, a larger resource pool may be allocated to a user group having a higher priority. Herein, a plurality of resource pools for PSCCHs and a plurality of resource pools for PSSCHs are set. As a PSCCH resource pool #1 and a PSSCH resource pool #1 are allocated for the user group #1, a resource pool for the PSCCH and a resource pool for the PSSCH may be individually allocated.

Method 2: One resource pool is formed of a plurality of transmission resources (simply referred to as resources). For example, a PSCCH resource pool is formed of a plurality of PSCCH transmission resources. A position of a resource by which one PSCCH can be transmitted may be indicated by $n_{PSCCH}$. Herein, $n_{PSCCH}$ may be referred to as a control channel resource index.

When N PSCCHs are multiplexed and transmitted by using the PSCCH resource pool, a range of $n_{PSCCH}$ becomes 0–N–1. A specific set formed of a plurality of $n_{PSCCH}$ may correspond to a specific user group. For convenience of description, the specific set of the plurality of $n_{PSCCH}$ may be referred to as "a resource index set."

For example, when four user groups have different priorities, a user group #1 may correspond to a resource index set #1 (0-9 $n_{PSCCH}$), a user group #2 may correspond to a resource index set #2 (10-19 $n_{PSCCH}$), a user group #3 may correspond to a resource index set #3 (20-29 $n_{PSCCH}$), and a user group #4 may correspond to a resource index set #4 (30-39 $n_{PSCCH}$). In this case, a resource index set formed of more $n_{PSCCH}$s may be allocated to a user group having a higher priority. According to this method, although a plurality of resource pools are not set, it is possible to perform priority control in the D2D communications by using a plurality of transmission resources constituting a resource pool.

Method 3: A plurality of resource pools are set for PSCCHs and PSSCHs, and then a number of the resource pools that can be used depending on the priority is determined.

For example, resource pools (a resource pool #1 to a resource pool #4) are set for four PSCCHs and PSSCHs. Then, a user group having a highest priority may be permitted to perform the D2D communications by using all resource pools (the resource pool #1 to resource pools #4), and a user group having a lowest priority may be permitted to use one resource pool (e.g., resource pool #4).

Method 4: Priority processing according to the above-described Method 1 to Method 3 is dealt with in views of resource allocation. Specifically, high channel occupation and transmission success probability are secured by allocating more resources to a user group having a higher priority.

In contrast, a method of linking a priority with a link quality is possible. A transmission power may be allocated or more stable MCS may be used for the D2D communications between user groups having priorities. For example, when four user groups have different priorities, a larger power is allocated to a user group #1 having a higher priority than a user group #4 having a lower priority. Further, when PSSCH resources are scheduled, more resources are allocated to a user group #1 having a higher priority than a user group #4 having a lower priority, such that a high successful redundancy transmission probability of data through the PSSCH to a user group having a higher priority may be increased.

Method 5: The four methods (Method 1-Method 4) may be independently used or may be combined to perform priority control.

For example, Method 2 and Method 4 are mixed to set one large resource pool, and then a large number of $n_{PSCCH}$s and large power may be allocated to a user group #1 having a higher priority. In other words, a resource index set having many $n_{PSCCH}$s and large power may be allocated to the user group #1 having a higher priority.

Method 6: A position/magnitude and a transmission format of a resource that is to be used by using the PSCCH may be determined by using the PSCCHs.

Method 2 allows a priority to correspond to $n_{PSCCH}$. Further, an exclusive PSSCH resource may correspond to a specific for priority control. For example, a PSSCH resource may be preferentially allocated to $n_{PSCCH}$ that is allocated to a user group or an application having a highest priority (e.g., in the case of Method 2, a resource index set #1 ($0 \leq n_{PSCCH} \leq 9$)), and the remaining PSSCH resources may be allocated to $n_{PSCCH}$ that is allocated to a user group or an application having a low priority. In this way, it is possible to accomplish collision avoidance and relieving of the PSSCH resource in a user group or an application having a high priority.

Next, a priority control method in D2D communications according to another exemplary embodiment of the present invention will be described.

In the present exemplary embodiment, priority control is performed through continuous resource allocation.

When continuous data transmission is needed for, e.g., image transmission, it is necessary to transmit a phrase "resource reservation indication bit" through the PSCCH. When a terminal UE1 transmits the PSCCH at an $n^{th}$ predetermined period saPeriod, it is possible to reserve and use a same resource as used to transmit the PSCCH for an $(n+1)^{th}$ predetermined period saPeriod by setting the resource reservation indication bit as 1. Specifically, when terminal UE1 transmits the PSCCH for the $n^{th}$ predetermined period saPeriod with a resource $n_{PSCCH}$=k by setting the resource reservation indication bit as 1 through the PSCCH, the terminal UE1 may transmit the PSCCH for the $(n+1)^{th}$ predetermined period saPeriod by using a resource corresponding to $n_{PSCCH}$=k. In this case, other terminals UE2, UE3, . . . do not use the resource ($n_{PSCCH}$=k) that is used when the terminal UE1 transmits the PSCCH for the $n^{th}$ predetermined period saPeriod, for the $(n+1)^{th}$ predetermined period saPeriod.

When the resource reservation indication bit is set as 1 for a last predetermined period saPeriod of an SFN period, this effect is applied to a first predetermined period saPeriod of a next SFN period. In other words, the terminal UE1 may transmit the PSCCH by using the resource ($n_{PSCCH}$=k) that is used when the terminal UE1 transmits the PSCCH for a last predetermined period saPeriod of a previous SFN, for a first predetermined period saPeriod of a next SFN. In this case, data can be continuously transmitted for a longer time.

Herein, although values of $n_{PSCCH}$ used in an $n^{th}$ predetermined period saPeriod and an $(n+1)^{th}$ predetermined period saPeriod are the same, a position/magnitude and a transmission format of a resource used for PSSCH transmission for the n-th predetermined period saPeriod and the $(n+1)^{th}$ predetermined period saPeriod may not be the same. Resource allocation and transmission formats related to the PSSCH are determined depending on information transmitted by the PSCCH, and the resource allocation and transmission formats of the PSSCH may be dynamically changed in a unit of a predetermined period saPeriod.

Meanwhile, an authority to use a resource reservation indication bit may be given depending on transmission packets and terminal priorities. For example, the authority to use the resource reservation indication bit is given to a terminal having a higher priority, and it is permitted to set this bit as 0 or 1 to use it. In the case that no authority to use the resource reservation indication bit is given, the resource reservation indication bit may be determined to be always set as 0.

Next, a priority control method in D2D communications according to yet another exemplary embodiment of the present invention will be described.

In the present exemplary embodiment, priority control is performed through a next period channel occupying indication.

When a plurality of terminals transmit packets by using a same channel, an algorithm that is called LBT (listen before talk) is generally used to prevent collisions between packets.

In the LBT, a transmitting terminal having a packet to be transmitted monitors whether the channel is being used by another terminal before transmitting the packet, and may transmit the packet when the channel is not occupied and may not transmit the packet when the channel is occupied.

Figure 2:
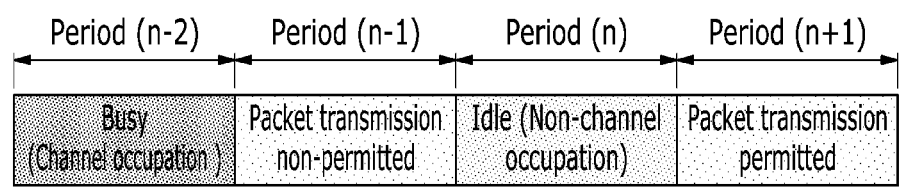
FIG. 2 illustrates an example of a condition in which a terminal can transmit a packet according to an exemplary embodiment of the present invention.

FIG. 2 illustrates an example of a condition in which a terminal can transmit a packet according to an exemplary embodiment of the present invention.

As shown in FIG. 2, a terminal monitors an occupied state for an arbitrary period "n" before packet transmission. When it is determined that the occupied state is idle (non-occupied state), it may be considered that the terminal transmits its packet for a period "n+1". As shown in FIG. 2, in a period "n−2", the channel is occupied, and thus it is difficult to transmit the packet for a period "n−1".

If a terminal that is transmitting the packet through the channel for a current period can display whether the channel is continuously being used for a next period, it is possible to efficiently use the channel. For example, as shown in FIG. 2, if a terminal that transmits the packet for the period n−2 can simultaneously report whether the channel is being continuously used for the period n−1, although checking that the channel is occupied for the period n−2, another terminal can attempt to perform packet transmission for the period n−1. For example, a terminal that transmits the packet for the period n−2 reports that the channel is not continuously used for the period n−1, although checking that the channel is occupied for the period n−2, another terminal can perform packet transmission for the period n−1.

In this case, another terminal can transmit the packet for the period n−1, and thus can efficiently use resources.

Figure 3:
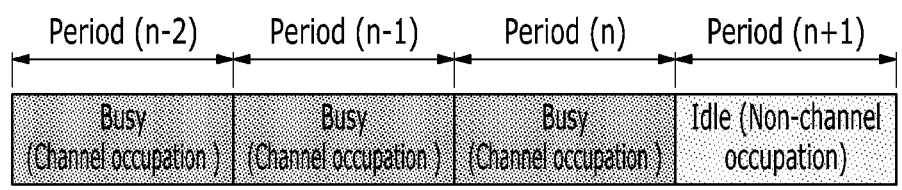
FIG. 3 illustrates an example of a condition in which a terminal can transmit a packet according to an exemplary embodiment of the present invention.
Figure 3:
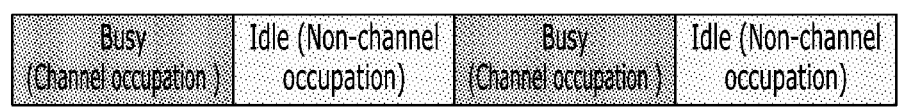

FIG. 3 illustrates an example of a condition in which a terminal can transmit a packet according to an exemplary embodiment of the present invention.

As shown in FIG. 3, "packet transmission non-permitted period" is more frequently indicated in the case of transmitting a short packet by using one period than in the case of transmitting a long packet by using a plurality of periods. In the case of transmitting the short packet, the next period channel occupying indication according to the present exemplary embodiment is more efficient.

The next period channel occupying indication according to the present exemplary embodiment may be performed by using various methods.

Information reporting "whether to continuously use a channel" may be included in the packet.

Alternatively, a reference signal inserted into a packet when a transmitting terminal transmits the packet may be used to support receiver's channel estimation. In the LBT, a transmitting terminal having a packet to be transmitted generally measures a magnitude of the received signal, i.e., a received signal strength indicator (RSSI) to determine whether to use the channel, and a magnitude of the RS is measured based on the RSSI. In the case of using the RS, two types of RS may be designed. Specifically, an RS-1 may indicate continuous use of a channel, and an RS-2 may indicate ending the use of the channel In the case of using the RS, a receipt magnitude of the reference signal, i.e., a reference signal received power (RSRP), may be used instead of the RSSI.

The RSRP is measured by receiving each of the RS-1 and the RS-2 transmitted from a transmitting terminal at the side of the receiver (e.g., any terminal having a packet to be transmitted). When the RSRP that is equal to or greater than a predetermined value is related to the RS-1, it is determined that the transmitting terminal signals "continuous use of the channel". When the RSRP that is equal to or greater than a predetermined value is related to the RS-2, it is determined that the transmitting terminal signals "ending the use of the channel". Then, the transmitting terminal at the side of the receiver may determine its own future behavior based on the determination result related to the RS.

As described above, when whether to continuously use the channel is signaled by using the RS, the packet transmission non-permitted period illustrated in FIG. 3 is removed. Accordingly, it is possible to efficiently use the resource.

This RS may be used for the priority control. A plurality of RSs may be defined, and the RSs may correspond to priority levels. For example, when there are K priorities, an RS-K may correspond to a priority K by using, e.g., a method of allowing an RS-1 to correspond to a priority 1 and an RS-2 to correspond to a priority 2.

Further, an RS-0 may be additionally defined to signal the continuous use of the channel, and the RS-1 to the RS-K may be used to signal ending the use of the channel. In this case, when the RSRP of the RS-m is equal to or greater than a predetermined level for a next period, a terminal having a priority m or a priority that is higher than m may attempt packet transmission.

For example, usages of K+1 RSs (RS-0 to RS-K) may be defined as follows.

RS-0: indicating continuous occupation for a next period
RS-1-RS-K: indicating use of the channel for the current period but no use of the channel for a next period When a transmitting terminal that transmits a packet for the current period does not transmits the packet for a next period, one of the RS-1 to the RS-K may be used to report that the channel is not used for the next period. In this case, when an RS-m (1≤m≤K) is used, a terminal having a priority that is equal to or higher than m may transmit the packet by using a channel that is released for the next period, but a terminal having a priority that is lower than m may transmit no packet for the next period.

Figure 4:
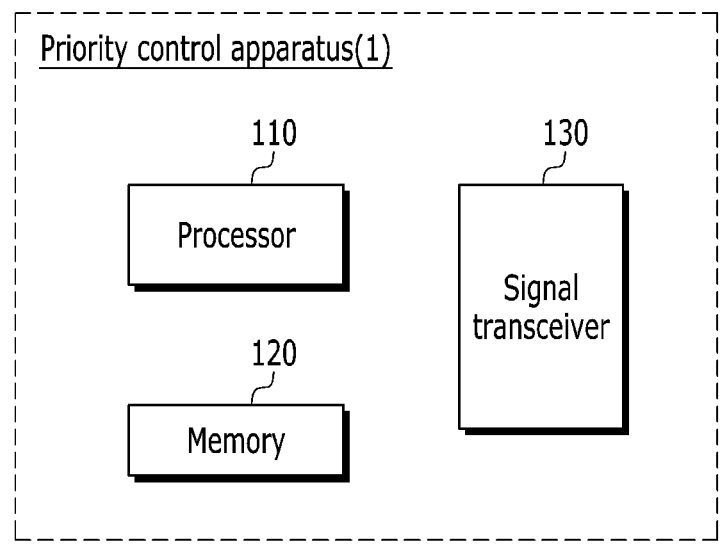
FIG. 4 is a configuration diagram illustrating a priority control apparatus according to an exemplary embodiment of the present invention.

FIG. 4 is a configuration diagram illustrating a priority control apparatus according to an exemplary embodiment of the present invention.

As shown in FIG. 4, according to an exemplary embodiment of the present invention, a priority control apparatus 1 includes a processor 110, a memory 120, and a radio frequency (RF) converter 130. The processor 110 may be configured to perform the methods that have been described with reference to FIG. 1 to FIG. 3.

The memory 120 is connected with the processor 110 to store a variety of information related to an operation of the processor 110. The RF converter 130 is connected with the processor 110 to transmit or receive a wireless signal.

According to an exemplary embodiment of the present invention, different priorities can be applied to communication objects such as various applications or user groups in device-to-device communications. Accordingly, it is possible to efficiently use transmission resources.

The above exemplary embodiments of the present invention are not implemented only by the aforementioned method and apparatus, but may be implemented using a program for realizing a function corresponding to the construction of the exemplary embodiment of the present invention or a recording medium on which the program has been recorded. The implementation may be easily achieved by those having ordinary skill in the art to which the present invention pertains from the above exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A control method in device-to-device communications in which a plurality of devices transmit packets through a same channel, the method comprising:

transmitting, by one of the devices transmitting a packet for a current period, a first reference signal for instructing continuous use of the channel when the one device continues packet transmission for a next period; and transmitting, by the one device, a second reference signal for instructing to end the use of the channel when the one device does not use the channel for the next period, wherein a plurality of transmission resources are classified into resource index sets, the one device has one of the resource index sets allocated thereto depending on a priority of the one device, and the one device transmits the first reference signal or the second reference signal by using a transmission resource corresponding to the allocated resource index set.

2. The method of claim 1, wherein the second reference signal includes a plurality of second reference signals, each of which has a priority assigned thereto, each of the devices has a priority associated thereto, and another one of the devices having a priority that corresponds to or is higher than the priority of a transmitted second reference signal is permitted to attempt packet transmission.

3. A control method in device-to-device communications in which a plurality of devices transmit packets through a same channel, the method comprising:

monitoring the channel by one of the devices;

not attempting, by the one device, packet transmission for a next period upon receiving a first reference signal for instructing continuous use of the channel from another device; and attempting, by the one device, packet transmission for the next period upon receiving a second reference signal for instructing to end the use of the channel from the another device, wherein a plurality of transmission resources are classified into resource index sets, one of the resource index sets is allocated to the another device depending on a priority of the another device, and the first reference signal or the second reference signal is transmitted by using a transmission resource corresponding to the allocated resource index set.

4. The method of claim 3, wherein the one device does not attempt or does attempt packet transmission for the next period when a magnitude of the first reference signal or the second reference signal is equal to or greater than a predetermined level.

5. The method of claim 3, wherein when receiving the second reference signal, the one of the devices is permitted to attempt packet transmission if a priority of the one device corresponds to or is higher than a priority of the received second reference signal.

6. A control apparatus in device-to-device communications in which a plurality of devices transmit packets through a same channel, the apparatus comprising:
   a radio frequency (RF) converter configured to transmit/receive a signal through an antenna; and
   a processor connected with the RF converter, wherein the processor is configured to
      transmit a first reference signal for instructing continuous use of the channel when packet transmission continues for a next period, and
      transmit a second reference signal for instructing to end the use of the channel when the channel for the next period is not used through the RF converter in a current period, wherein
   a plurality of transmission resources are classified into resource index sets,
   a device of the apparatus has one of the resource index sets allocated thereto depending on a priority of the device, and
   the RF converter is configured to transmit the first reference signal or the second reference signal by using a transmission resource corresponding to the allocated resource index set.

7. The apparatus of claim 6, wherein
   the second reference signal includes a plurality of second reference signals, each of which has a priority assigned thereto,
   each of the devices has a priority associated thereto, and
   another one of device having a priority that corresponds to or is higher than a priority of a transmitted second reference signal is permitted to attempt packet transmission.

* * * * *